United States Patent
Dutta (10) Patent No.: US 8,547,931 B2
(45) Date of Patent: Oct. 1, 2013

(54) CONSERVING CALL LOGIC DURING HANDOFF

(75) Inventor: Amit Kumar Dutta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 12/469,876

(22) Filed: May 21, 2009

(65) Prior Publication Data

US 2010/0296645 A1    Nov. 25, 2010

(51) Int. Cl.
*H04L 12/66*   (2006.01)
*H04M 7/00*   (2006.01)
*H04W 4/00*   (2009.01)

(52) U.S. Cl.
USPC ........... 370/331; 370/352; 379/229; 709/217

(58) Field of Classification Search
USPC ............... 370/261–331, 352–356, 401–467; 379/212–219, 229–265; 709/217–229; 455/436–445
See application file for complete search history.

(56) References Cited

U.S. PATENT DOCUMENTS

| | | | |
|---|---|---|---|
| 6,856,676 B1 | 2/2005 | Pirot et al. | 379/201.01 |
| 6,996,222 B2 * | 2/2006 | Chakera | 379/212.01 |
| 6,996,618 B2 * | 2/2006 | Apostolopoulos et al. | 709/227 |
| 7,092,385 B2 | 8/2006 | Gallant et al. | 370/352 |
| 7,266,099 B2 * | 9/2007 | Roy et al. | 370/331 |
| 7,315,742 B2 | 1/2008 | Creamer et al. | 455/442 |
| 7,738,445 B2 * | 6/2010 | Ibezim et al. | 370/352 |
| 7,872,994 B2 * | 1/2011 | Garg et al. | 370/260 |
| 8,145,217 B2 * | 3/2012 | Wang et al. | 455/436 |
| 8,200,747 B2 * | 6/2012 | Apostolopoulos et al. | 709/203 |
| 2003/0093537 A1 * | 5/2003 | Tremlett et al. | 709/228 |
| 2004/0203664 A1 | 10/2004 | Lei et al. | 455/414.1 |
| 2005/0027818 A1 * | 2/2005 | Friedman et al. | 709/217 |
| 2006/0078094 A1 | 4/2006 | Breen et al. | |
| 2007/0123258 A1 * | 5/2007 | Sawyer | 455/436 |
| 2007/0207805 A1 * | 9/2007 | Pallares Lopez et al. | 455/436 |
| 2008/0037447 A1 | 2/2008 | Garg et al. | 370/260 |
| 2008/0084986 A1 | 4/2008 | Kumarasamy et al. | |
| 2008/0146245 A1 * | 6/2008 | Appaji | 455/456.1 |
| 2009/0034516 A1 * | 2/2009 | Liu et al. | 370/353 |
| 2009/0092093 A1 * | 4/2009 | Wu et al. | 370/331 |
| 2009/0111472 A1 * | 4/2009 | Promenzio et al. | 455/439 |
| 2010/0183002 A1 * | 7/2010 | Gallant et al. | 370/352 |

OTHER PUBLICATIONS

International Search Report dated Dec. 15, 2010 cited in Application No. PCT/US2010/035032.

(Continued)

*Primary Examiner* — Man Phan
(74) *Attorney, Agent, or Firm* — Merchant & Gould (57) ABSTRACT

Conserving call logic during handoff may be provided. First, a call may be received at a first server. Next, the first server may determine that it cannot handle the call. Then the call may be transferred by the first server to a second server with enough information so that the second server can take up the call where the first server left off. Transferring the call to the second server with enough information so that the second server can take the call up where the first server left off may comprise placing the information in a REFERRED-BY header and sending the REFERRED-BY header to the second server.

16 Claims, 4 Drawing Sheets

(56) References Cited

OTHER PUBLICATIONS

"Enhanced Methods for SIP based Session Mobility in a Converged Network", http://ieeexplore.ieee.org/stamp/stamp.jsp?arnumber=04299043, 5 pgs., Mar. 30, 2009.

Wang Miao et al., "A Fast Handover Solution for SIP-based Mobility", http://ieeexplore.ieee.org/stamp/stamp.jsp?arnumber=01696341, pp. 315-320, Mar. 30, 2009.

"SIP—Call Transfer Enhancements Using the Refer Method", http://www.cisco.com/en/US/docs/ios/12_2t/12_2t13/feature/guide/ftsipref.html#wp1040310, 18 pgs., Mar. 30, 2009.

Chapter 26: SIP Call Transfer, Cisco 7600 Series Routers Session Border Controller Configuration Guide, http://www.cisco.com/en/US/docs/routers/7600/install_config/sbc_config_guide_2/sbc_stx.pdf, pp. 26-1-26-4, Mar. 30, 2009.

* cited by examiner

CONSERVING CALL LOGIC DURING HANDOFF

BACKGROUND

In a multi-server environment, a call may reach a receiving server. The receiving server, however, may determine that it cannot handle the call and may transfer the call to a transfer server so that the call can be serviced. In conventional systems, however, the call is not transferred with enough context and information so that the transfer server receiving the transferred call can seamlessly pick up from where the receiving server left off.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Conserving call logic during handoff may be provided. First, a call may be received at a first server. Next, it may be determined that the call cannot be handled by the first server. Then the call may be transferred to a second server with enough information so that the second server can take up the call where the first server left off.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Conserving call logic during handoff may be provided. Consistent with embodiments of the invention, in a multi-server environment, a call may reach a first server. The first server may determine that it cannot handle the call, but it may know that a second server can handle the call. Consequently, the first server may transfer the call to the second server so that the call may be serviced by the second server. Consistent with embodiments of the invention, the call may be transferred with enough context and information so that the second server may seamlessly pick up the call from where the first server left off. This may be important for user experience because, if enough context and information is not sent along with the call, the user making the call may hear a second ringing tone and may be forced to re-enter data already entered into the first server. In other words, the user may have to start over from the beginning of a menu even though the user has already progressed in the menu and may be somewhere deep inside a state machine. Embodiments of the invention may achieve a seamless handoff using a session initiation protocol (SIP) environment using SIP aware devices.

Embodiments of the invention may use a SIP protocol method to transfer enough context in mid-call to enable the second server to begin processing the call from where the first server left off. Consistent with embodiments of the invention, the REFER mechanism along with a REFERRED-BY Header may be used to pass adequate call context logic in a call transfer.

Figure 1:
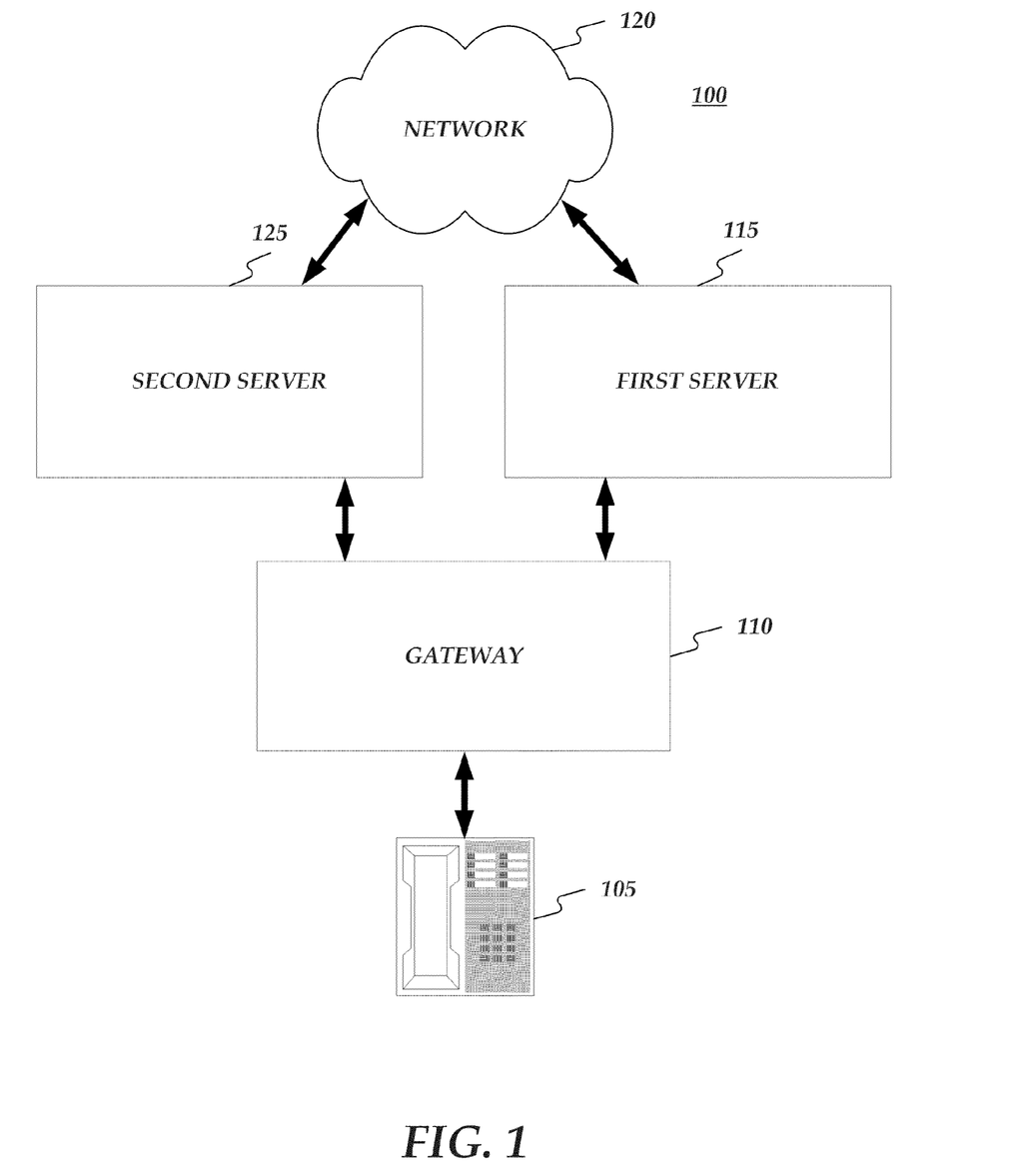
FIG. 1 is a block diagram of an operating environment.

FIG. 1 is a block diagram of an operating environment 100 consistent with embodiments of the present invention. Operating environment 100 may comprise a calling console 105 (e.g. a telephone), a gateway 110, a first server 115, a network 120, and a second server 125. Calling console 105 may comprise a session initiation protocol (SIP) enabled telephone. SIP is a signaling protocol widely used for setting up and tearing down multimedia communication sessions such as voice and video calls over the Internet for example. Gateway 110 may comprise a Voice over Internet Protocol (VoIP) gateway. VoIP is a general term for a family of transmission technologies for delivery of voice communications over IP networks such as the Internet or other packet-switched networks. Either or both of first server 115 and second server 125 may be implemented using a computing device 400 as described in more detail below with respect to FIG. 4. Network 120 may comprise, but is not limited to, the Internet, any packet-switched network, or any other type network.

Figure 2:
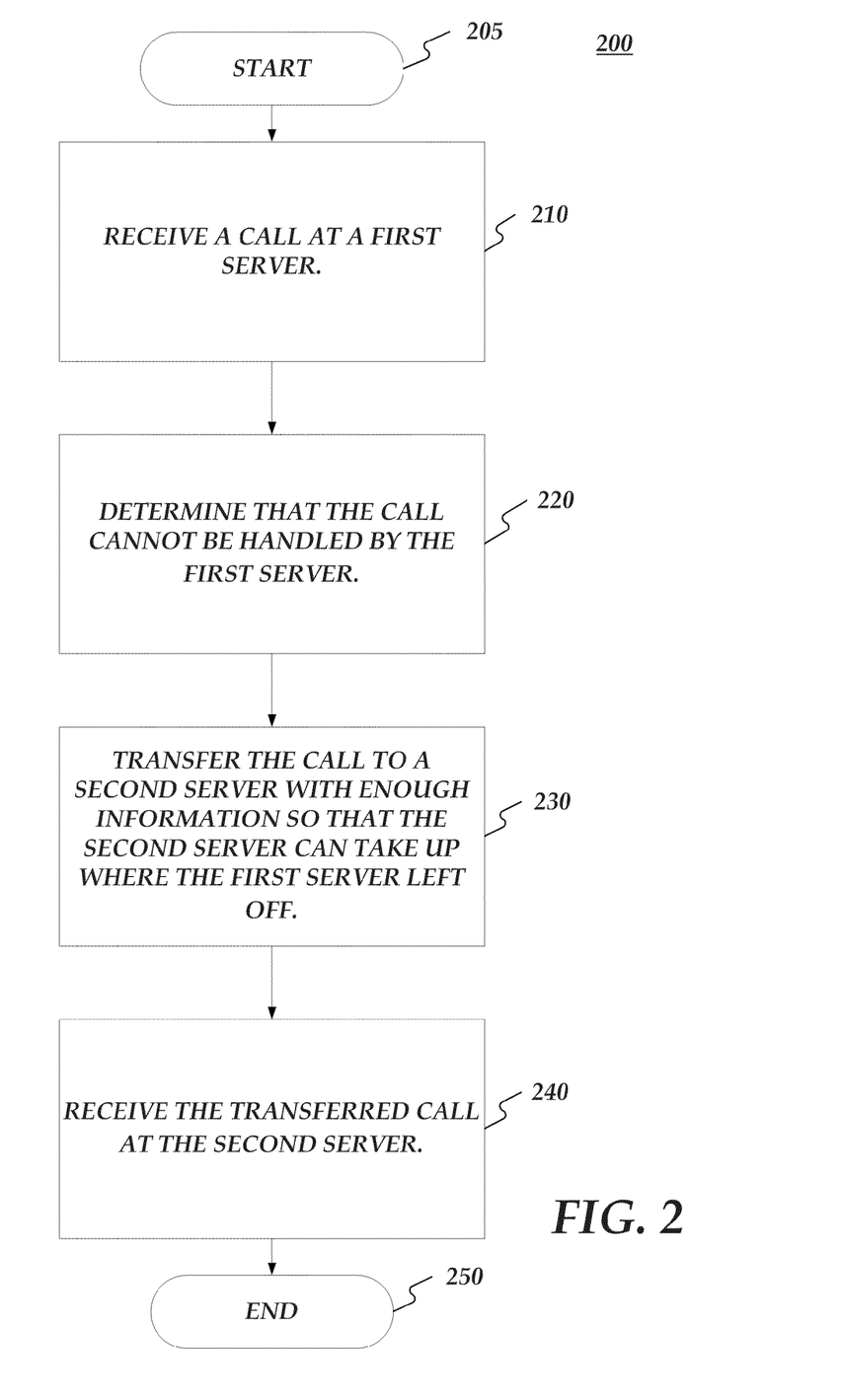
FIG. 2 is a flow chart of a method for conserving call logic during handoff.

FIG. 2 is a flow chart setting forth the general stages involved in a method 200 consistent with an embodiment of the invention for conserving call logic during a call handoff. Method 200 may be implemented using, for example, first server 115 and second server 125. Ways to implement the stages of method 200 will be described in greater detail below.

Method 200 may begin at starting block 205 and proceed to stage 210 where first server 115 may receive a call. For example, a user may make the call using calling console 105. The call may comprise a Voice over Internet Protocol (VoIP) call. The call may come into gateway 110, which may be setup so that all new calls are sent from gateway 110 to first server 115.

From stage 210, where first server 115 receives the call, method 200 may advance to stage 220 where first server 115 may determine that the call cannot be handled by first server 115. For example, when the call comes in, first server 115 services may ask the user to enter an extension of a called party. First server 115 may then look up (e.g. query) the entered called party extension in a database. The database may be located on first server 115 or located on network 120. At this point first server 115 may determine, for example, that the entered called party extension is not one serviced by first server 115. For example, first server 115 may determine that a voice mail box associated with the entered called party extension is not located on first server 115. Information obtained by the aforementioned database query may indicate, for example, that the voice mail box associated with the entered called party extension is not located on the first server 115, but rather on second server 125. In other words, first server 115 may determine that the call may be handled by second server 125. For example, the voice mail box associated with the called party associated with the call may be located on second server 125.

Once first server 115 determines that the call cannot be handled by first server 115 in stage 220, method 200 may continue to stage 230 where first server 115 may transfer the call to second server 125 with enough information so that second server 125 can take up where first server 115 left off. For example, first server 115 may transfer the call to second server 125 through gateway 110. First server 115 may send a REFER to gateway 110 asking gateway 110 to call second server 125. In this process, first server 115 may add a REFERRED-BY header including the entered called party extension. The following is an example of how such a message in SIP might look: REFER-TO: <sip: 66242@10.197.92.86;transport=tcp; user=phone>REFERRED-BY: <sip: 66250@10.197.118.188>. In addition, first server 115 may also pass, in the REFERRED-BY header, an optional context token to pass second server 125 some extra information if needed. Gateway 110 upon receiving the REFER may copy the REFERRED-BY header and the context token into a new INVITE for gateway 110 to send out to second server 125.

After first server 115 transfers the call in stage 230, method 200 may proceed to stage 240 where second server 125 may receive the transferred call. For example, second server 125 may receive the call from gateway 110 and second server 125 services may now service the received transferred call. Accordingly, the call may be transferred to second server 125 with enough context and information so that second server 125 may seamlessly pick up the call from where first server 115 left off by using data from the REFERRED-BY header. The REFERRED-BY header, for example, may include the telephone extension number of the user extension associated with the called party associated with the call. Second server 125, upon getting the aforementioned INVITE, may look for the token in the REFERRED-BY header. If this REFERRED-BY header is present, then second server 125 may consume the REFERRED-BY header to transition to the appropriate point in the Finite State Machine and directly take the transferred user to the pin-enter prompt. Consequently, the user may be switched to second server 125 from the same point at which the user left first server 115. Accordingly, second server 125 may seamlessly pick up the call from where first server 115 left off. In other words, this process may hand off the call to a different location and yet may preserve the context of the call so that the call can be logically carried on from that point. Once second server 125 receives the transferred call in stage 240, method 200 may then end at stage 250.

An embodiment consistent with the invention may comprise a system for conserving call logic during a call handoff. The system may comprise a memory storage and a processing unit coupled to the memory storage. The processing unit may be operative to receive a call at a first server, determine that the call cannot be handled by the first server, and transfer the call to a second server with enough information so that the second server can take up the call where the first server left off.

Another embodiment consistent with the invention may comprise a system for conserving call logic during a call handoff. The system may comprise a memory storage and a processing unit coupled to the memory storage. The processing unit may be operative to determine that a call cannot be handled by a first server. In response to the processing unit determining that the call cannot be handled by the first server, the processing unit may determine that the call can be handled by a second server. The processing unit may be operative to transfer the call to the second server with enough information so that the second server can take up the call where the first server left off. The processing unit being operative to transfer the call may comprise the processing unit being operative to place the enough information in a REFERRED-BY header send the REFERRED-BY header to the second server.

Yet another embodiment consistent with the invention may comprise a system for conserving call logic during a call handoff. The system may comprise a first server and a second server. The first server may comprise a first memory storage and a first processing unit coupled to the first memory storage. The first processing unit may be operative to receive, from a Voice over Internet Protocol (VoIP) gateway, a call comprising a Voice over Internet Protocol (VoIP) call and determine that the call cannot be handled by the first server. The first processing unit may be further operative to determine that the call can be handled by a second server and to transfer, through the VoIP gateway, the call to the second server with enough information so that the second server can take up the call where the first server left off. The first processing unit being operative to transfer the call to the second server with enough information so that the second server can take the call up where the first server left off comprises the first processing unit being operative to place the enough information in a REFERRED-BY header and send the REFERRED-BY header to the second server. The second server may comprise a second memory storage and a second processing unit coupled to the second memory storage. The second processing unit may be operative to receive the transferred call from the first server.

Figure 3:
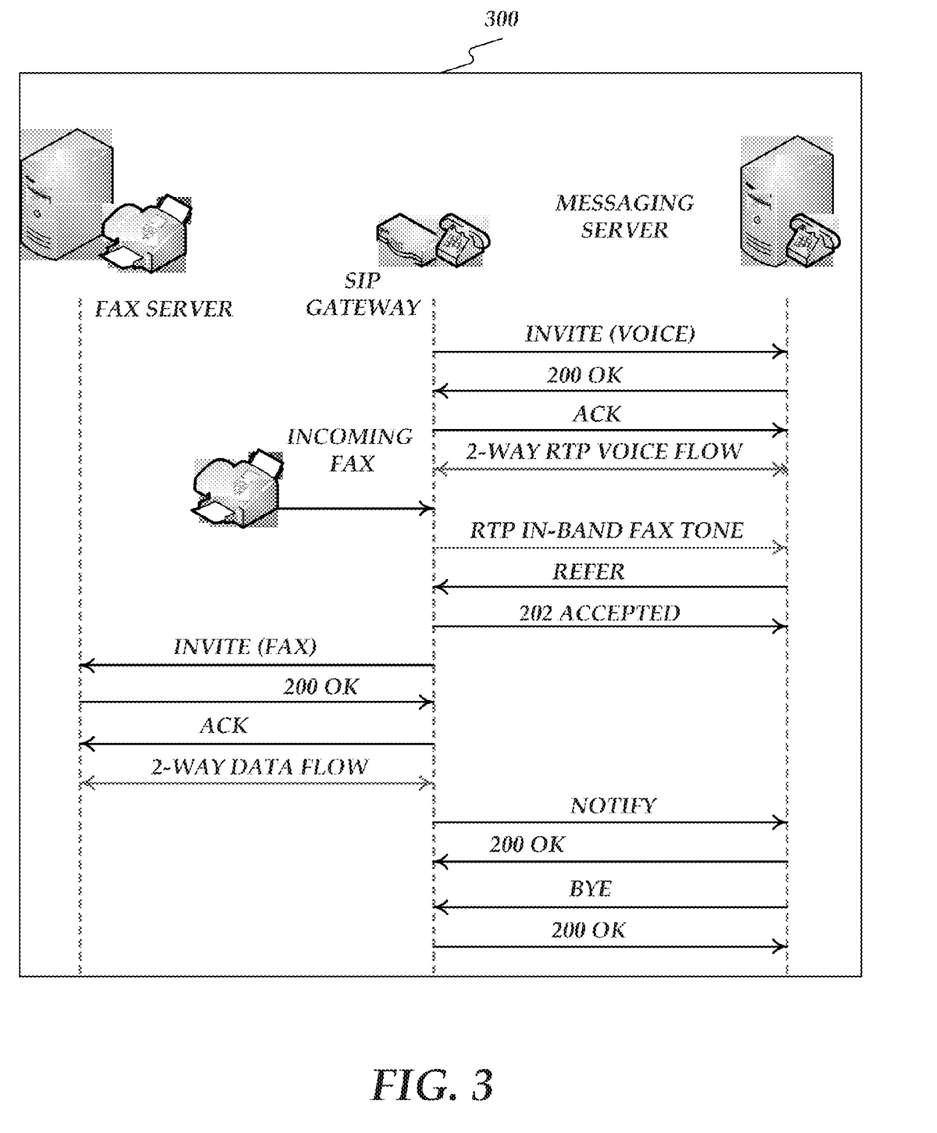
FIG. 3 is a diagram illustrating conserving call logic during handoff for a fax.

FIG. 3 is a diagram 300 illustrating conserving call logic during handoff for a fax. Consistent with embodiments of the invention, a user may have a single phone number that may also provide voicemail and fax. Once a messaging server receives the call and the call transitions to fax mode, the messaging server may need to handoff this call to a fax server for the fax server to process the call and take delivery of the fax. Later the fax server may send the recipient the fax it received by delivering it to the user's e-mail inbox for example. Similar to the process described above with respect to FIG. 2, a call may be handed off to the fax server so that the fax server can continue taking the fax. FIG. 3 illustrates the call sequence diagram for the fax example described above. In the FIG. 3 process, the REFER is sent along with a REFERRED-BY header, for example: Referred-By: sip: exum1.exdc.contoso.com; msExchUMFaxRecipient=smtp: jdoe@contoso.com; msExchUMCallingNumber=3457859756. This extra information passed in the REFERRED-BY header may give enough context to the fax server to properly compose a fax message for the intended recipient and later deliver it back to the messaging server. Consequently, embodiments of the invention may pass enough context to build the message appropriately and may pass enough context so that the fax server can continue where the call left off. Consistent with embodiments of the invention, the caller may be unaware that the caller has been talking to some other server (e.g. the fax server.)

Figure 4:
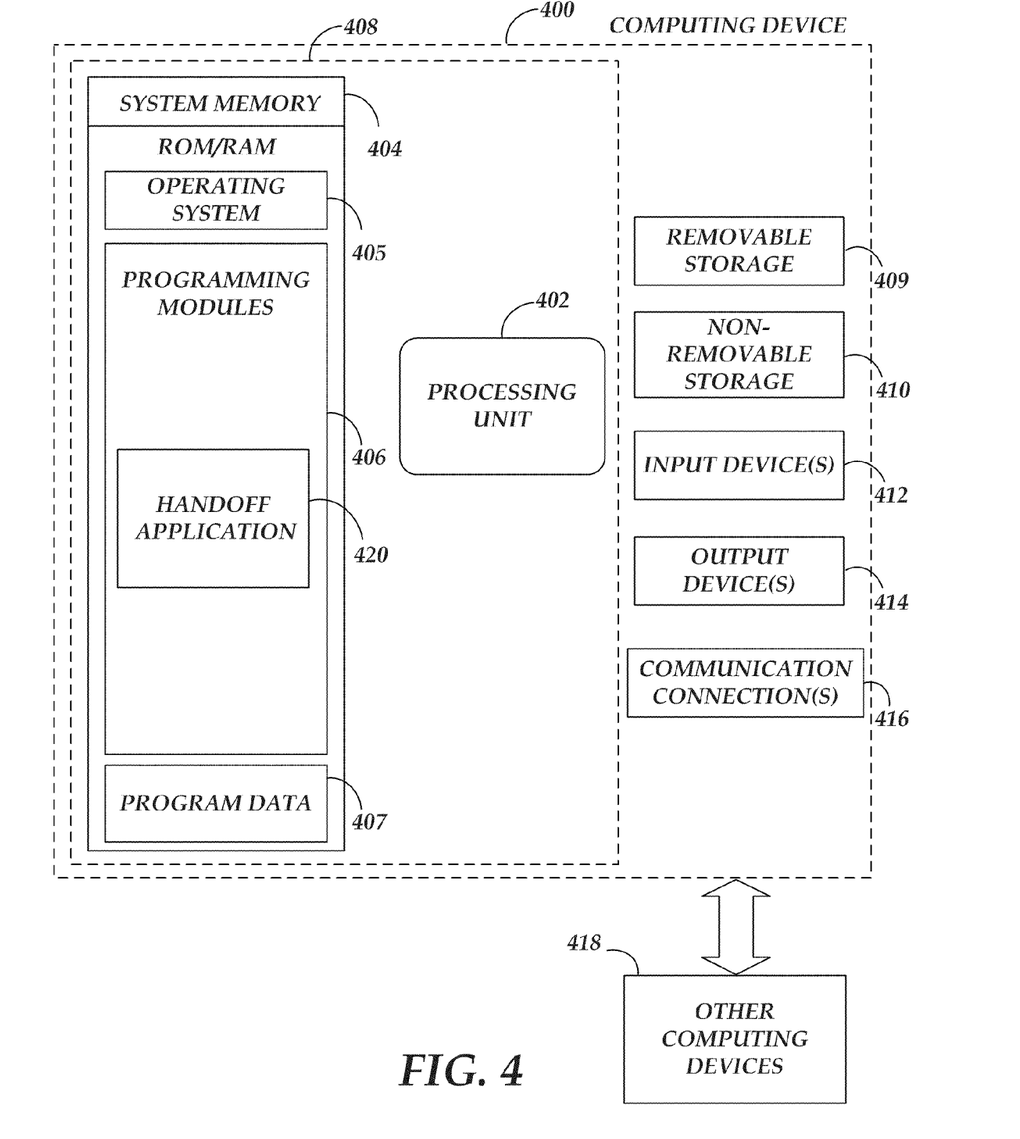
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include, for example, a handoff application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. handoff application 420) may perform processes including, for example, one or more method 200's stages as described above. Handoff application 420 may be executed on either one of or both of first server 115 and second server 125. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for conserving call logic during handoff, the method comprising:
   receiving a call at a first server;
   determining that the call cannot be handled by the first server, wherein determining that the call cannot be handled by the first server comprises:
      determining that a voice mail box associated with a called party associated with the call is not located on the first server,
      querying a database on a network to determine where the voice mail box associated with the called party is located, and
      determining that the voice mail box associated with the called party is located on the second server; and
   transferring the call to the second server with enough information so that the second server can take up the call where the first server left off, wherein transferring the call to the second server with the enough information so that the second server can take up the call where the first server left off comprises enabling the second server to transition to a point within a state machine where the first server left off, the point within the state machine representing a location and a context of the call where the first server left off.

2. The method of claim 1, wherein receiving the call at the first server comprises receiving the call comprising a Voice over Internet Protocol (VoIP) call.

3. The method of claim 1, wherein receiving the call at the first server comprises receiving the call from a Voice over Internet Protocol (VoIP) gateway.

4. The method of claim 3, wherein receiving the call from the Voice over Internet Protocol (VoIP) gateway comprises receiving the call at the Voice over Internet Protocol (VoIP) gateway from a calling console comprising a session initiation protocol (SIP) enabled telephone.

5. The method of claim 1, wherein determining that the call cannot be handled by the first server comprises determining, by the first server, that the call cannot be handled by the first server.

6. The method of claim 1, wherein determining that the call cannot be handled by the first server comprises determining, by the first server, that a voice mail box associated with a called party associated with the call is not located on the first server.

7. The method of claim 1, wherein transferring the call to the second server comprises transferring the call through a Voice over Internet Protocol (VoIP) gateway to the second server.

8. The method of claim 1, wherein transferring the call to the second server with enough information so that the second server can take the call up where the first server left off comprises:
   placing the enough information in a REFERRED-BY header; and
   sending the REFERRED-BY header to the second server.

9. The method of claim 8, wherein placing the enough information in the REFERRED-BY header comprises placing the enough information in the REFERRED-BY header wherein the enough information comprises a telephone extension number of a user extension associated with a called party associated with the call.

10. The method of claim 1, further comprising receiving the transferred call at the second server.

11. The method of claim 1, further comprising, in response to determining that the call cannot be handled by the first server, determining by the first server that the call can be handled by the second server.

12. A computer-readable storage medium that stores a set of instructions which when executed perform a method for conserving call logic during handoff, the method executed by the set of instructions comprising:
  determining that a call cannot be handled by a first server;
  determining that a voice mail box associated with a called party associated with the call is not located on the first server;
  querying a database on a network to determine where the voice mail box associated with the called party is located;
  determining that the voice mail box associated with the called party is located on the second server; and
  transferring the call to the second server with enough information so that the second server can take up the call where the first server left off, wherein transferring the call to the second server with enough information so that the second server can take the call up where the first server left off comprises:
    placing the enough information in a REFERRED-BY header; and
    sending the REFERRED-BY header to the second server, the REFERRED-BY header being configured to enable the second server to transition to a point within a state machine where the first server left off, the point within the state machine representing a location and a context of the call where the first server left off.

13. The computer-readable storage medium of claim 12, wherein placing the enough information in the REFERRED-BY header comprises placing the enough information in the REFERRED-BY header wherein the enough information comprises a telephone extension number of a user extension associated with a called party associated with the call.

14. The computer-readable storage medium of claim 12, further comprising receiving the call at the first server.

15. The computer-readable storage medium of claim 14, wherein receiving the call at the first server comprises receiving the call comprising a Voice over Internet Protocol (VoIP) call.

16. A system for conserving call logic during handoff, the system comprising:
  a first server comprising:
    a first memory storage; and
    a first processing unit coupled to the first memory storage, wherein the first processing unit is operative to:
      receive, from a Voice over Internet Protocol (VoIP) gateway, a call comprising a Voice over Internet Protocol (VoIP) call,
      determine that a voice mail box associated with a called party associated with the call is not located on the first server;
      query a database on a network to determine where the voice mail box associated with the called party is located;
      determine that the voice mail box associated with the called party is located on the second server, and
      transfer, through the VoIP gateway, the call to the second server with enough information so that the second server can take up the call where the first server left off, wherein the first processing unit being operative to transfer the call to the second server with enough information so that the second server can take the call up where the first server left off comprises the first processing unit being operative to
        place the enough information in a REFERRED-BY header, and
        send the REFERRED-BY header to the second server; and
  the second server comprising:
    a second memory storage; and
  a second processing unit coupled to the second memory storage, wherein the second processing unit is operative to:
    receive the transferred call from the first server,
    consume the REFERRED-BY header,
  and transition, based on the REFERRED-BY header, to a point within a state machine where the first server left off, the point within the state machine representing a location and a context of the call where the first server left off.

* * * * *